UNITED STATES PATENT OFFICE.

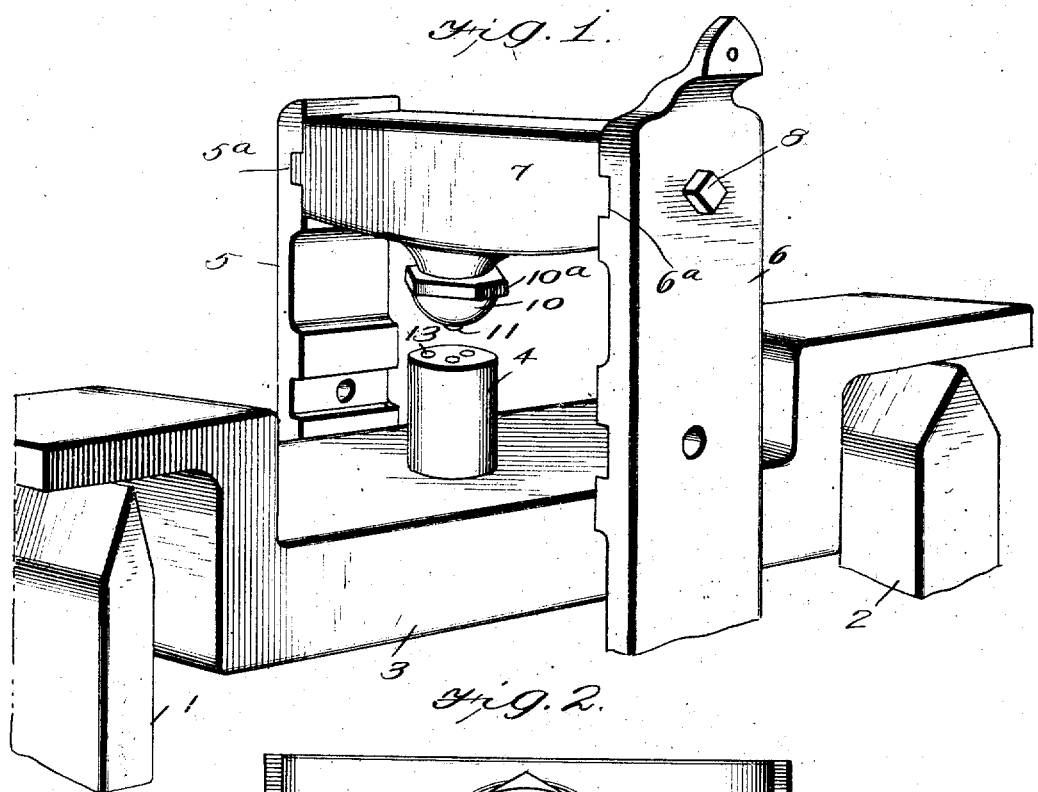
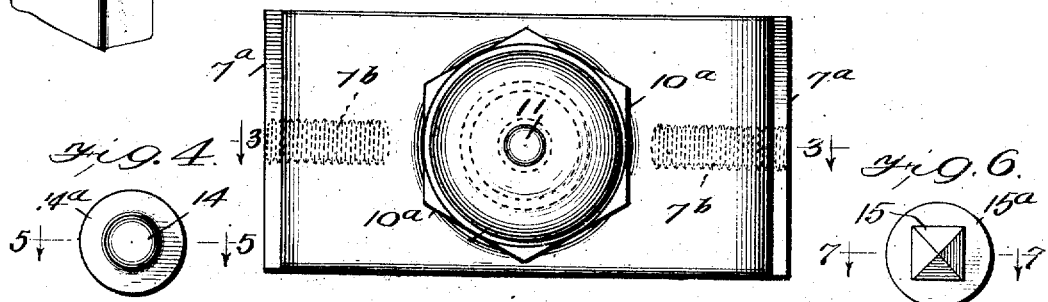
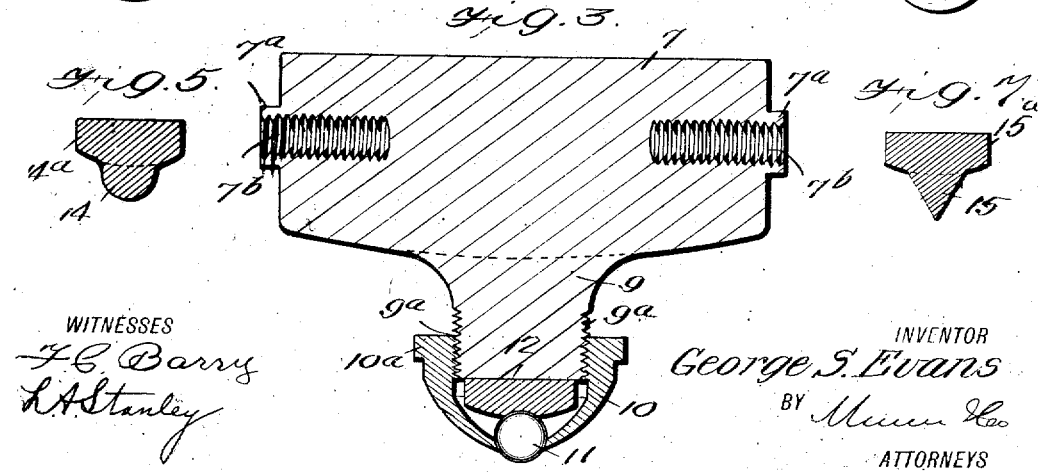

GEORGE SEPTIMUS EVANS, OF LENOIR CITY, TENNESSEE.

ATTACHMENT FOR TESTING-MACHINES.

1,120,461. Specification of Letters Patent. Patented Dec. 8, 1914.

Application filed July 9, 1914. Serial No. 849,997.

*To all whom it may concern:*

Be it known that I, GEORGE S. EVANS, a citizen of the United States, and a resident of Lenoir City, in the county of London and State of Tennessee, have invented a new and useful Improvement in Attachments for Testing-Machines, of which the following is a specification.

My invention relates to improvements in attachments for testing machines, more particularly those machines which are designed to test the hardness of metals, and it consists in the combinations, constructions and arrangements herein described and claimed.

An object of my invention is to provide a device by means of which a testing machine such as that used for transverse tensile and compression testing is made use of in testing hardness.

A further object of my invention is to provide a device by means of which hardness may be tested according to the so-called Brinell ball impression test.

By the use of the attachment, a further object of my invention is to provide a novel form of attachment in which either a ball may be used as the impression forming member, or a cone may be used in lieu of the ball, the ball or cone holder providing for the ready change from one to the other.

My invention is illustrated in the accompanying drawing forming part of this application, in which—

Figure 1 is a perspective view showing the attachment applied to a testing machine, Fig. 2 is a bottom plan view of the ball holder and support, Fig. 3 is a section along the line 3—3 of Fig. 2, Fig. 4 is a bottom plan view of a modified form of impression member, Fig. 5 is a section on the line 5—5 of Fig. 4, Fig. 6 is a bottom plan view of another modified form of impression member, and Fig. 7 is a sectional view along the line 7—7 of Fig. 6.

In carrying out my invention I may make use of any of a number of tensile or compression testing machines. It will be understood therefore that I do not confine myself to the particular type of machine disclosed herein, since it will be obvious that the attachment may be made to machines of other than the form shown herein.

Referring now to Fig. 1 it will be seen I have shown two stationary supports or uprights 1 and 2 respectively which bear a U-shaped supporting member 3. The latter is designed to furnish a support for the block 4 of metal to be tested. At 5 and 6 I have indicated movable members of the testing machine. These members may be actuated by any suitable power means such as that ordinarily employed in testing machines of this type. Instead of using the connecting cross bar I make use of a special cross bar which is best illustrated in Fig. 3. This bar has a body portion 7 and is provided with end tongues 7ª arranged to enter grooves 5ª and 6ª in the members 5 and 6 respectively. The body portion is provided with threaded bores 7ᵇ at each end arranged to receive bolts 8 for securely fastening the cross bar to the members 5 and 6. The underside of the cross bar 7 is provided with an extension 9 which has a cylindrical threaded portion 9ª. The latter is designed to receive a hemispherical cap 10 whose upper edge is made of hexagonal shape in order to facilitate the turning of the cap. As will be seen from Fig. 3 the cap is provided with a circular recess through which the end of a hardened steel bore 11 projects. A bearing plate 12 is placed within the cap 10 in close engagement with the end of the threaded cylindrical extension 9ª. The bearing plate 12 is provided with a recess in its bottom of a shape to conform to the contour of the bore 11.

From the foregoing description of the various parts of the device, the operation thereof may be readily understood. The block 4 to be tested is placed upon the support 3 underneath the bore 11. The device is then set in operation so that the members 5 and 6 are drawn downwardly with a given force, the bore 11 is pressed into the previously machined upper surface of the block 4 and will leave impressions such as those shown at 13. In making the tests, the block is shifted so as to provide a plurality of impressions. The hardness of the metal is inversely proportional to the diameter of the impressions.

Instead of using a separate bore such as that shown at 11 and a plate 12, I may make the impression member and the plate integral. In Figs. 4 and 5 I have shown an impression member 14 which is integral with the plate 14ª. The cap 10 may be removed and this device used in lieu of the separate ball and plate.

In Figs. 6 and 7 I have shown another modified form in which the impression member 15 is in the form of a pyramid having a flat base 15ª.

I claim:

1. The combination with a testing machine having stationary uprights and members movable relatively thereto of a stationary work support carried by said stationary uprights, a detachable cross bar carried by said movable members, said cross bar having an extension on its bottom provided with a cylindrical threaded end, a hollow cap having a threaded portion arranged to engage said threaded end, said cap having a central opening in its bottom, and an impression member carried within the cap and arranged to bear against the end of said threaded extension, a portion of said impression member projecting through the opening in the cap.

2. The combination with a testing machine having stationary uprights and members movable relatively thereto of a stationary work support carried by said stationary uprights, a detachable cross bar carried by said movable members, said cross bar having an extension on its bottom provided with a cylindrical threaded end, a hollow cap having a threaded portion arranged to engage said threaded end; said cap having a central circular opening in its bottom, a spherical hardened ball disposed in said circular opening, a portion of the ball projecting through the opening, and a bearing plate disposed between the ball and the end of said extension, said bearing plate having a recess conforming with the contour of the ball and arranged to receive a portion of the ball.

GEORGE SEPTIMUS EVANS.

Witnesses:
H. E. COPELAND,
SAM'L C. WILLIAMS.

Copies of this patent may be obtained for five cents each, by addressing the "Commissioner of Patents, Washington, D. C."